US010735457B2

(12) United States Patent
Rouatbi et al.

(10) Patent No.: US 10,735,457 B2
(45) Date of Patent: Aug. 4, 2020

(54) INTRUSION INVESTIGATION

(71) Applicant: Microsoft Technology Licensing, LLC, Redmond, WA (US)

(72) Inventors: Mohamed Rouatbi, Bellevue, WA (US); Julian Federico Gonzalez, Jr., Issaquah, WA (US); Marcus Peinado, Bellevue, WA (US); Mariusz H. Jakubowski, Bellevue, WA (US); Svetlana Gaivoronski, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 129 days.

(21) Appl. No.: 15/723,832

(22) Filed: Oct. 3, 2017

(65) Prior Publication Data

US 2019/0104147 A1    Apr. 4, 2019

(51) Int. Cl.
| | |
|---|---|
| G06F 21/00 | (2013.01) |
| H04L 29/06 | (2006.01) |
| G06F 21/55 | (2013.01) |
| H04W 12/00 | (2009.01) |

(52) U.S. Cl.
CPC .......... *H04L 63/1441* (2013.01); *G06F 21/55* (2013.01); *H04L 63/1408* (2013.01); *H04L 63/1425* (2013.01); *H04L 2463/121* (2013.01); *H04W 12/00502* (2019.01)

(58) Field of Classification Search
CPC .................... H04L 63/1441; H04L 63/1408
USPC ......................................................... 726/23
See application file for complete search history.

(56) References Cited

U.S. PATENT DOCUMENTS

| | | | |
|---|---|---|---|
| 8,438,174 B2 | 5/2013 | Shields et al. | |
| 8,490,191 B2* | 7/2013 | Kuegler ............... | G06F 21/123 713/156 |
| 2010/0299430 A1 | 11/2010 | Powers et al. | |
| 2017/0026395 A1 | 1/2017 | Mumcuoglu et al. | |
| 2017/0223046 A1* | 8/2017 | Singh ................... | H04L 43/062 |
| 2018/0091529 A1* | 3/2018 | Luger ................. | H04L 63/1483 |

FOREIGN PATENT DOCUMENTS

EP        2863309 A2    4/2015

OTHER PUBLICATIONS

Stallard, et al., "Automated Analysis for Digital Forensic Science: Semantic Integrity Checking", In Proceedings of 19th Annual Computer Security Applications Conference, Dec. 8, 2003, 8 pages.
Mohammed, et al., "An Automated Approach for Digital Forensic Analysis of Heterogeneous Big Data", In Journal of Digital Forensics Security and Law, vol. 11, Issue 2, Apr. 2016, pp. 137-152.

(Continued)

*Primary Examiner* — Longbit Chai
(74) *Attorney, Agent, or Firm* — Dicke, Billig & Czaja, PLLC

(57) ABSTRACT

A process to investigate intrusions with an investigation system is disclosed. The process receives forensic facts from a set of forensic events on a system or network. A suspicious fact is identified from the forensic facts. A related fact from the forensic facts is identified based on the suspicious fact.

20 Claims, 3 Drawing Sheets

(56) References Cited

OTHER PUBLICATIONS

Garfinkel, Simson, "Automated Digital Forensics", https://crcs.seas.harvard.edu/event/simson-gartinkel-automated-digital-forensics, Published on: Oct. 18, 2010, 2 pages.
"Ghiro", http://www.getghiro.org/, Retrieved on: Jun. 27, 2017, 4 pages.
Pasquale, et al., "Requirements-Driven Adaptive Digital Forensics", In Proceedings of 21st IEEE International Requirements Engineering Conference, Jul. 15, 2013, 2 pages.
James, et al., "Challenges with Automation in Digital Forensic Investigations", In Journal of Computing Research Repository, Mar. 2013, 17 pages.
Lin, et al., "Automated Analysis of Multi-source Logs for Network Forensics", In Proceedings of First International Workshop on Education Technology and Computer Science, Mar. 7, 2009, pp. 660-664.
"International Search Report and Written Opinion Issued in PCT Application No. PCT/US2018/046386", dated Nov. 20, 2018, 11 pages.
Yu, et al., "Engineering Adaptive Digital Investigations using Forensics Requirements", Retrieved from https://arxiv.org/pdf/1402.0997.pdf , Feb. 5, 2014, 13 Pages.

\* cited by examiner

INTRUSION INVESTIGATION

BACKGROUND

Information security services and digital forensics services relate to the investigation and prevention of digital intrusions, such as the breach and exploitation of computer systems and networks, and can include intrusion investigation systems. An intrusion investigation system is a tool, such as a device or software application, that can monitor a network or system for malicious activity or policy violations and gathers evidence that indicates the security of the system or network of interest has been breached. In some examples, intrusion investigation systems can attempt to reconstruct the intrusion or attack from the evidence gathered. The scope of intrusion investigation systems can vary greatly, from simple tools and libraries to hierarchical systems that scrutinize an entire network. In some examples, intrusion investigation systems can further include intrusion prevention mechanisms.

SUMMARY

This summary is provided to introduce a selection of concepts in a simplified form that are further described below in the Description. This summary is not intended to identify key features or essential features of the claimed subject matter, nor is it intended to be used to limit the scope of the claimed subject matter.

A digital intrusion investigation system of the disclosure links together different forensic events on a system or network of interest to help an investigator reconstruct a compromise or breach and its consequences. The investigation system receives a set of forensic facts from a set of forensic events on the system or network of interest. A suspicious fact is identified from the forensic facts. The system identifies related fact from the forensic fact is identified based on the suspicious fact. In one example, the related fact becomes another suspicious fact and comprising identifying another related fact based on the another suspicious fact in an iterative process. The investigation system can reconstruct a chain of related forensics facts back and forth in time, such as along a timeline in a visualization, and measure probabilities of such relation. The investigation system can further highlight the chain to an investigator who can edit or modify the output.

BRIEF DESCRIPTION OF THE DRAWINGS

The accompanying drawings are included to provide a further understanding of embodiments and are incorporated in and constitute a part of this disclosure. The drawings illustrate embodiments and together with the description serve to explain principles of embodiments. Other embodiments and many of the intended advantages of embodiments will be readily appreciated, as they become better understood by reference to the following description. The elements of the drawings are not necessarily to scale relative to each other. Like reference numerals designate corresponding similar parts.

DESCRIPTION

In the following Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following description, therefore, is not to be taken in a limiting sense. It is to be understood that features of the various exemplary embodiments described herein may be combined with each other, unless specifically noted otherwise.

Figure 1:
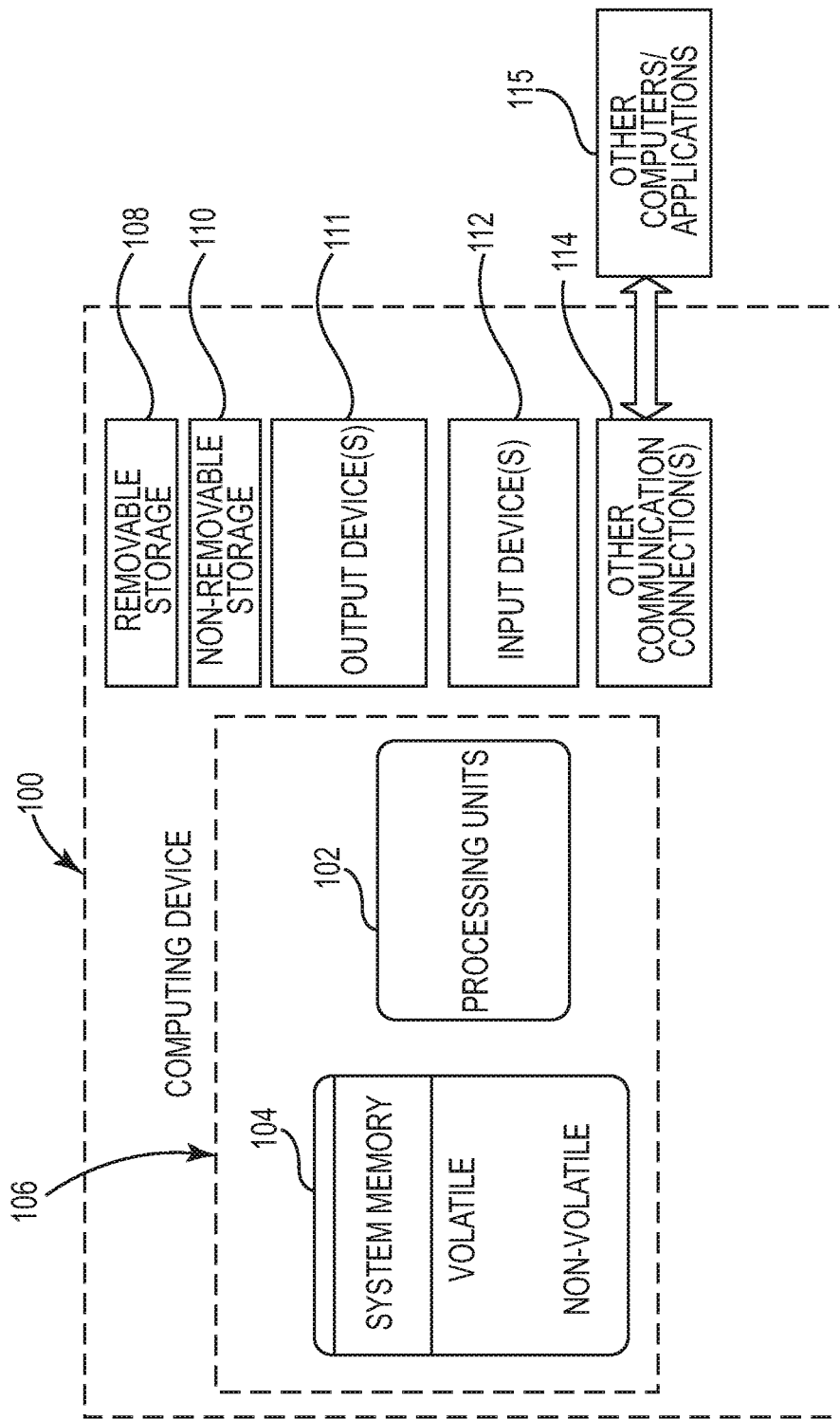
FIG. 1 is a block diagram illustrating an example of a computing device.

FIG. 1 illustrates an exemplary computer system that can be employed in an operating environment and used to host or run a computer application included on one or more computer readable storage mediums storing computer executable instructions for controlling the computer system, such as a computing device, to perform a process such as a method of investigation in an intrusion investigation system.

The exemplary computer system includes a computing device, such as computing device 100. The computing device 100 can take one or more of several forms. Such forms include a tablet, a personal computer, a workstation, a server, a handheld device, a consumer electronic device (such as a video game console or a digital video recorder), or other, and can be a stand-alone device or configured as part of a computer network.

In a basic hardware configuration, computing device 100 typically includes a processor system having one or more processing units, i.e., processors 102, and memory 104. By way of example, the processing units may include two or more processing cores on a chip or two or more processor chips. In some examples, the computing device can also have one or more additional processing or specialized processors (not shown), such as a graphics processor for general-purpose computing on graphics processor units, to perform processing functions offloaded from the processor 102. The memory 104 may be arranged in a hierarchy and may include one or more levels of cache. Depending on the configuration and type of computing device, memory 104 may be volatile (such as random access memory (RAM)), nonvolatile (such as read only memory (ROM), flash memory, etc.), or some combination of the two.

Computing device 100 can also have additional features or functionality. For example, computing device 100 may also include additional storage. Such storage may be removable or non-removable and can include magnetic or optical disks, solid-state memory, or flash storage devices such as removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes RAM, ROM, EEPROM, flash memory or other memory technology, CD-ROM, digital versatile discs (DVD) or other optical storage, magnetic cassettes, magnetic tape, magnetic disk storage or other magnetic storage devices, universal serial bus (USB) flash drive, flash memory card, or other flash storage devices, or any other storage medium that can be used to store the desired information and that can be accessed by computing device 100. Accordingly, a propagating signal by itself does not qualify as storage media. Any such computer storage media may be part of computing device 100.

Computing device 100 often includes one or more input and/or output connections, such as USB connections, display ports, proprietary connections, and others to connect to various devices to provide inputs and outputs to the computing device. Input devices 112 may include devices such as keyboard, pointing device (e.g., mouse, track pad), stylus, voice input device, touch input device (e.g., touchscreen), or other. Output devices 111 may include devices such as a display, speakers, printer, or the like.

Computing device 100 often includes one or more communication connections 114 that allow computing device 100 to communicate with other computers/applications 115. Example communication connections can include an Ethernet interface, a wireless interface, a bus interface, a storage area network interface, and a proprietary interface. The communication connections can be used to couple the computing device 100 to a computer network, which can be classified according to a wide variety of characteristics such as topology, connection method, and scale. A network is a collection of computing devices and possibly other devices interconnected by communications channels that facilitate communications and allows sharing of resources and information among interconnected devices. Examples of computer networks include a local area network, a wide area network, the Internet, or other network.

Digital forensics investigations are time-consuming endeavors that rely on qualified investigators. During a typical investigation, an investigator can process millions of records from several digital artifacts on a computer system or network of interest. The investigator often attempts to link related events from the forensic data to reconstruct the intrusion and its consequences.

During the digital forensic investigation, investigators often seek to extract indicators of compromise. An indicator of compromise, which is dubbed an IOC in the parlance, is often described in the forensics space as evidence on a computing device that indicates the security of the system or network of interest has been breached. Investigators usually gather indicators of compromise after being informed of a suspicious incident, on a scheduled basis, or after the discovery of unusual call-outs from the system or network of interest. Typical indicators of compromise include file names, file hashes such as an MD5 hash or SHA256 hash, registry keys, addresses such as a command and control domain or hardcoded IP addresses, user names, certificates, and many other data. Ideally, this information is gathered to detect similarly compromised systems or to create "smarter" tools such as intrusion detection systems that can detect and quarantine suspicious files in the future.

The use of indicators of compromise in digital forensic investigations can include several drawbacks. Many indicators of compromise may be relevant within the context of an investigation but are otherwise noisy or irrelevant. For example, in cases of a compromised machine repurposed to perform click fraud, threat actors download and use common and popular types of browser plug-ins to generate fraudulent traffic. While in context of a digital forensics investigation an indicator of compromise might include the file name of the browser plug-in, the file name cannot be applied as a general detection of compromise due to a due to high rate of false positives. Similarly, an indicator of compromise may lack context even in case of malicious behavior. Also, indicators of compromise are typically signature-based and are not resistant to obfuscation. For example, a few bytes added to a malicious file may change the file hash, which could render previously collected file hashes of the malicious file confusing or even useless to an intrusion detection system in an indicator of compromise based or indicator of attack based investigation.

To address some of the limitations, digital forensics investigations can be directed to indicators of attack, or IOAs. IOAs focus on detecting the intent of what an attacker is trying to accomplish regardless of the malware or exploit used in an attack. A successful phishing email attempts to persuade a target to select a link or open a document that will infect the computing device. Once compromised, the attacker will stealthily execute another process, hide in memory and maintain persistence across reboots of the system. The next step is to make contact with a C2 server and await further instructions. IOAs are concerned with the execution of these steps, including the intentions of the attacker, and are not focused on the attacker's specific tools. In many cases, however, intrusion investigation or detection solutions focused on IOAs are still signature-based and are treated as indicators of compromise. Thus, an approach based on IOAs may reduce but not eliminate the limitations of solutions based on indicators of compromise.

Figure 2:
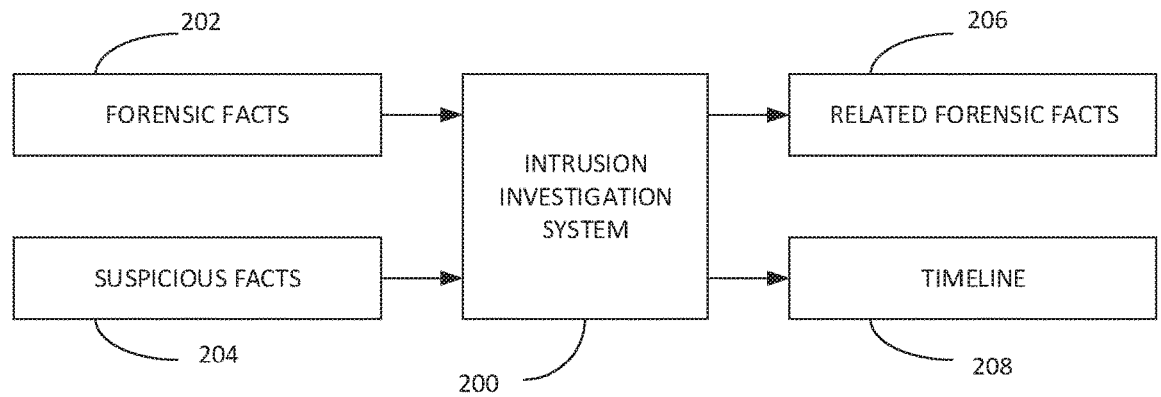
FIG. 2 is a schematic diagram illustrating an example intrusion investigation system.

FIG. 2 illustrates an example intrusion investigation system 200 for use in investigating intrusions such as compromised or breaches, such as by a hacker or attacker, in a system or network of interest. The intrusion investigation system 200 includes or receives a set of action-based forensic data that are designated as forensic facts 202, which are extracted from a set of general forensic data, referred to here as forensic events, on digital artifacts of a system or network of interest. Forensic facts 202 can be applied as indicators of compromise and as part of indicators of attack to make system 200 more resistant to obfuscations and to provide for more robust investigations. In one example, the intrusion detection system 200 performs the extraction of the forensic facts 202 from the general forensic events. An investigator or the system 200 designates a forensic fact from the set of forensic facts 202 as a suspicious forensic fact 204. In one example, the investigator or the system 200 may designate one or more suspicious forensic facts 204. The system 200 constructs a set of forensic facts related to the suspicious forensic facts 204, which are designated as related forensic facts 206. In one example, the related forensic facts 206 are presented along a timeline 208. In generating the related forensic facts 206, the system 200 can assign probabilities of the relation to the suspicious forensic facts 204 and highlight the chain of events along the timeline 208 for the investigator. The system 200 can iteratively calculate probabilities and discover related forensic facts 206 based on previously discovered related forensic facts 204 and analyst feedback.

Intrusion investigation system 200 can be implemented in a variety of forms for execution on a computing device, such as computing device 100, to detect additional intrusions on a system or network of interest. In one example, intrusion investigation system 200 can be implement as a stand-alone application or device, which may be used by computer security personnel or others on a selected system or networks of interest. In another example, intrusion investigation system 200 can be implemented as part of a security services in a cloud environment to protect and secure the cloud-based assets and resources of network users, such as cloud tenants, from malicious communication or other threats as part of a platform-as-a-service. In still another example, intrusion investigation system 200 may be implemented as a service provided as a software-as-a-service to subscribers. In still another example, the intrusion investigation system 200 can be implemented as a library or resource that can be used to develop other security applications. Additional implementations are contemplated.

A digital artifact is a data source that exists on a system or network of interest or elsewhere that provides data of activity on the system or network of interest. For instance, the digital artifact may keep track of system or network activity or activity performed on the system or network of interest. Example digital artifacts include master file tables, change journals that include information about any transformation made on a file system, event logs, registry keys, and other sources. Digital artifacts can include records of events or forensic events. Forensic facts 202 are action-based observables or action-based forensic events as a subset of the forensic events. For example, a forensic fact can be used as an indicator of compromise of type action. Intrusion investigation system 200 applies forensic facts 202 to target behavior patterns of attack rather than static patterns. Indicators of attack constructed from forensic facts 202 will be more resistant to obfuscation as it enables dynamic types as property values.

Each forensic fact of the forensic facts 202 can include one or more properties. These properties can be stored as fields with a record of the particular forensic fact in the set of forensic facts 202 developed in an investigation of the system or network of interest. As an example, a particular forensic fact of the set of forensic facts 202 can include "file $x_1$ was replaced with file $x_2$." The particular forensic fact can include multiple properties such as the name of the file being replaced ($x_1$), the name of the file the inserted file ($x_2$), and the timestamp. Additionally, the particular forensic fact of forensic facts 202 can include several other properties such as the hashes of file $x_2$, the hashes of file $x_2$, username, workstation name, and other information. In an example in which file $x_2$ is a malicious file, and an attacker has added several bytes of data to file $x_2$ to change the file hash, only one property, i.e., the hash of file $x_2$, will change so the particular forensic fact may remain relevant. An addition field in the record can be included to indicate a confidence of a correlation to another forensic fact based on an amount of properties that have changed with respect to the another forensic fact and a weight of such properties.

Another example of a forensic fact of forensic facts 202 includes a record from a master file table digital artifact. In this example, the record of a master file table can include a structure having a file type, reference number, file name, time of creation of the file, time of access of the file, time of modification, time of update, file size, user identifier, and group identifier. As forensic facts 202 include action, at least four different forensic facts can be extracted per record, including that the file was created (including properties of file type, file name, timestamp, file size, user identifier, group identifier), the file was modified, the file was accessed, and the file was updated.

Figure 3:
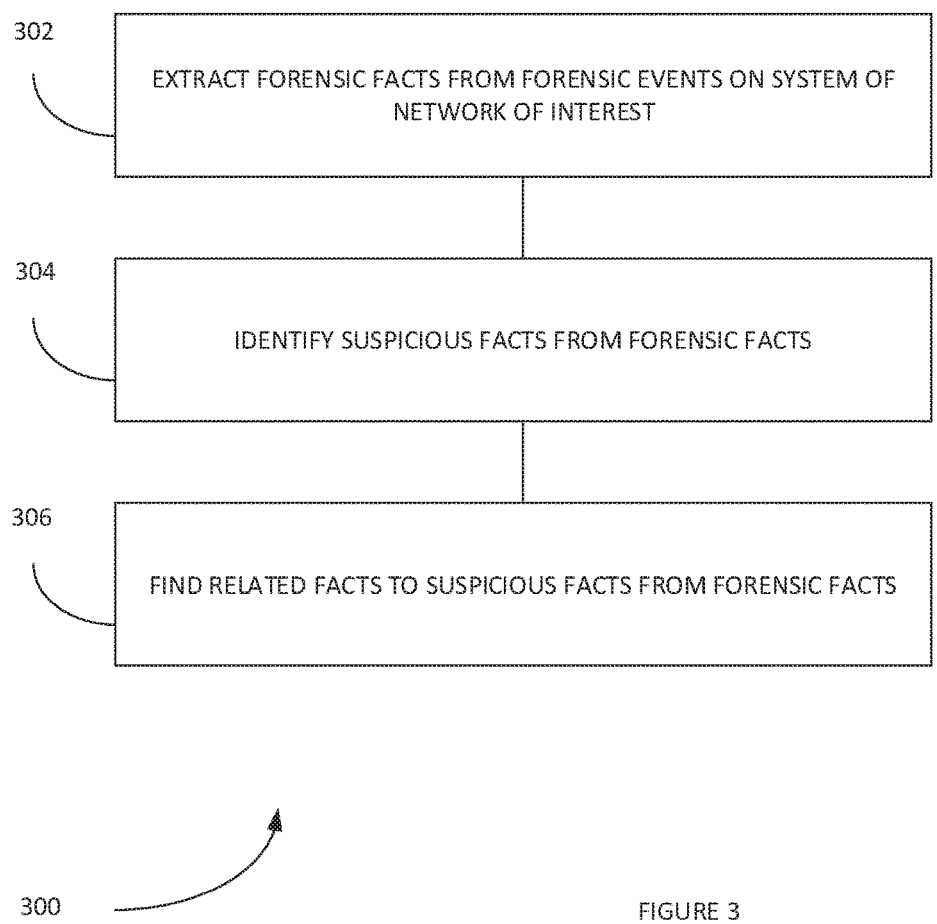
FIG. 3 is a block diagram illustrating an example method of the intrusion investigation system of FIG. 2.

FIG. 3 illustrates an example method 300 that can be implemented with investigation detection system 200. Forensic facts 202 are extracted from a system or network of interest at 302. Suspicious facts 204 are identified as a subset of the extracted forensic facts 202 at 304. For each suspicious fact, the system 200 finds related facts from the forensic facts 202 at 306. In the example, the related facts become suspicious facts, and the system 200 can find additional related facts from the forensic facts 202 again at 306. Additionally, weights of significance can be added to the discovered related facts at 306. The system 200 can continue to discover related facts from suspicious facts at 306 until a preselected criteria or condition is met.

Forensic facts 202 can be applied as indicators of compromise, and indicators of attack can be constructed from forensic facts 202. The forensic facts 202 are ordered as determined by timestamp or other time tracking mechanism. Intrusion detection systems can also apply the forensic facts 202 to look for similar chains of forensic events as determined by the order to detect intrusions on other systems or networks.

Figure 4:
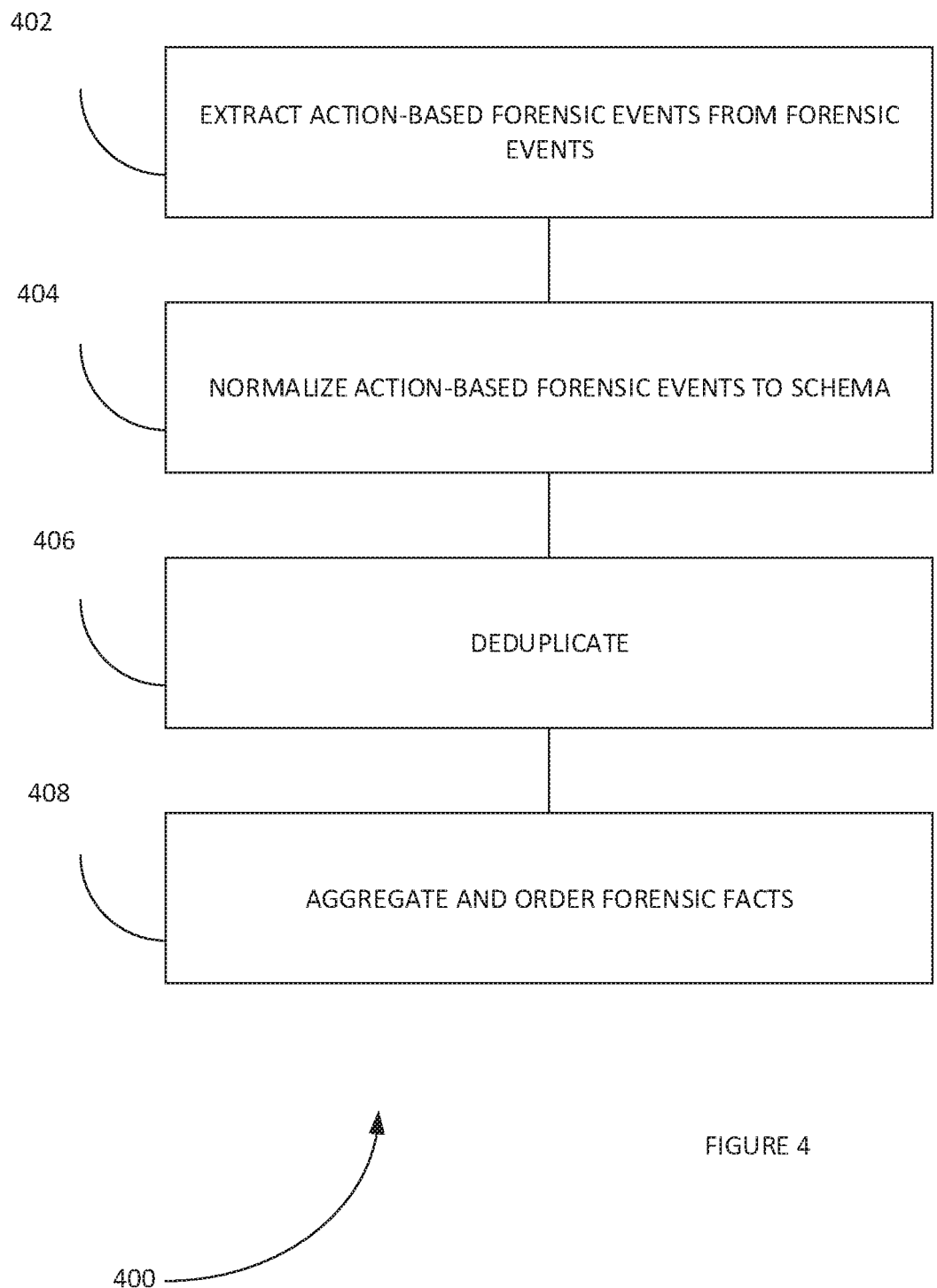
FIG. 4 is a block diagram illustrating an example method of the example method of FIG. 3.

FIG. 4 illustrates an example method 400 that can be implemented to extract forensic facts 202 from the system or network of interest at 302. Forensic events are received from the digital artifacts, and the action-based forensic events are extracted from the forensic events at 402. The action-based forensic events are normalized to a schema to include a record as a forensic fact having a set of properties at 404. More than one artifact may track the same forensic fact, so the extracted forensic facts are deduplicated at 406. Additionally, deduplicated forensic facts of a similar nature can be aggregated and ordered by timestamp and 408. The aggregated and ordered forensic facts can be stored as a datastructure in a database or file, and presented to the system 200 as forensic facts 202.

The schema for collecting properties at 404 can be general for all systems and networks, particular for artifacts in a system and network of interest, or a combination. The schema can include a set of properties collected for each artifact. In one example, artifacts on the system and network of interest can include master file table, change journal, most recently used, Amcache, successful logons, and events. An event identifier property may be included for each artifact. An account expires, algorithm name, and authentication package name property may be included for the events artifact and not for the other artifacts. Other examples of the properties and properties corresponding to one or more artifacts are contemplated.

As every action in the system or network of interest may leave a trace in multiple artifacts, there is a likelihood that multiple artifacts will tract the same forensic event. Additionally, the same or similar action may presented as different actions in the artifacts. For example, a creating a user on a system or network may include the forensic facts of from the master file table artifact as NTUSER.DAT was created, User/Documents/folder was created, User/Favorites folder was created, a registry file was updated as well as other actions from the artifact and other actions in other artifacts such as registry keys, event logs, and change journal.

The multiple forensic facts are deduplicated at 406. One example of deduplicating forensic facts includes comparison of time of the forensic event or the properties of the forensic fact to determine whether the forensic events are duplicates. An example considers the timestamp property of the forensic event to determine whether the forensic events occurred at the same time and also the properties of the forensic events to determine whether the events are the same or similar. In one example, forensic facts are deduplicated if at least two of the following three conditions are met: the difference in time stamps of the compared forensic events does not exceed a selected threshold, the amount or ratio of similar properties exceeds a selected threshold, and the values of the properties do not contradict each other above a selected threshold. The same forensic fact may include different properties depending on the artifact. In one example of deduplicating the forensic facts at 406, each set of the properties can be retained in the record.

Returning to FIG. 3, an analyst can select one or more suspicious facts at 304 from which to begin an investigation. The forensic facts 202 can be extracted at 302 prior to or subsequent to the identification of the suspicious facts or facts at 304. In one example, the suspicious fact or facts are selected from the set of forensic facts 202.

Related facts are developed from the set of forensic facts 202 at 306 based on the identified suspicious facts. In one example, two or more forensic facts are related if they share similar properties or values. Additionally, related facts can be assigned a degree or an amount of relation, which includes a value to a first forensic fact that indicates an amount of relation to a second forensic fact. Once a forensic fact is determined to be related to a suspicious fact, the related forensic fact is added to the set of suspicious facts, and the process of identifying related facts at 306 can be repeated. The process of identifying related facts can be repeated until a selected condition is met. In one example, conditions for stopping the process of finding related facts at 306 can include the investigator is satisfied with the results or the amount of suspicious and related facts developed, there are no more related facts developed from the set of suspicious facts at 306, or the weights or degree of relation of newly developed related facts at 306 are below a selected threshold.

Several example criteria or processes can be used to determine the weighted relation of the related forensic facts developed at 306. In one example, the weight W between two forensic facts is determined from $$W = (w_1 p_1 + w_2 p_2 + \ldots + w_n p_n) h_i$$

in which $0 \le w_j \le 1$, $\Sigma w_j^2 = 1$, $j = 1 \ldots n$ is the weight assigned to a given property of the forensic fact (for example, a weight assigned to a property of the hash of a file might be larger than the weight assigned to a property of the name of the file); $p_j$ is 0 if only one of the two forensic facts include this property, 1 if both forensic facts include this property and the property is the same or substantially similar, and (−1) if both forensic facts include this property and property is not the same or not substantially similar; and $h_1$ is the weight associated with the number of iterations at 306 (for example, additional iterations or repetitions of 306 can reduce the weight assigned to $h_1$.) In addition to or instead of a property-based assignment of weighted relations between related forensic facts, rule-based relations can be applied that assign weights based on a pre-defined knowledge base.

Once the related facts are determined, the system 200 can present the forensic facts along with the associated weights on a timeline such as in a visualization on a display.

In one example, an investigator has discovered a virus, such as a MassSender virus, which is a type of malware designed to delete or destroy or steal data on a computer of interest. The investigator might identify an action of Unpacking of MassSender from an ams.zip file. The system 200 can apply methods 300 and 400 to include a timeline with times (not shown) of related forensic facts and respective weights (from 0.0 to 1.0) such as:
Creation of new user TEMP, 0.85;
Creation of ams.zip by user TEMP, 1.0;
Unpacking of MassSender from ams.zip, (initially identified suspicion fact);
Installation of MassSender to ProgramFiles, 1.0;
Creation of NiceHashMiner by user TEMP, 0.7;
Execution of MassSender.exe, 1.0;
NWXODq8f.exe downloaded to Appdata\Temp by user TEMP, 0.7; and
Replacement of winlogon.exe with NWXODq8f.exe, 0.7.

System 200 applying methods 300, 400 can drastically reduce the amount of forensic events review by an investigator and provide connections to forensic facts that might not appear to be related (such as the relationship between a replacement of the system file with a Trojan (NWXODq8f.exe and the uppacking of MassSender from ams.zip). The investigator can include or exclude forensic facts and repeat 306 for a set of reconsidered results.

The example intrusion investigation system 200 and methods 300, 400 can be implemented to include a combination of one or more hardware devices and computer programs for controlling a system, such as a computing system having a processor and memory, to perform methods 300, 400 to discover additional instances of compromise on a system or network of interest. For example, the intrusion investigation system 200 and methods 300, 400 can be implemented as a computer readable medium or computer readable device having set of executable instructions for controlling the processor to perform the methods 300, 400.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein.

What is claimed is:

1. A method of investigating intrusions on a system or network, the method comprising:
   receiving forensic facts extracted from a set of observable forensic events in a digital artifact data source on the system or network, the forensic facts consisting of action-based forensic events, the forensic facts having dynamic type properties in a schema with a record, the record of the dynamic type properties in the schema including a plurality of properties having weights and including a confidence of correlation property to another forensic fact based on an amount of the properties in the record that have changed with respect to the another forensic fact and the weights of such properties;
   identifying a suspicious fact from the forensic facts, the identifying the suspicious fact includes initiating an investigation; and
   identifying a related fact from the forensic facts based on the dynamic type properties of the suspicious fact.

2. The method of claim 1 wherein the related fact becomes another suspicious fact and comprising identifying another related fact based on the another suspicious fact.

3. The method of claim 1 wherein identifying the suspicious fact includes identifying a plurality of suspicious facts.

4. The method of claim 1 comprising:
   adding a weight of significance to the related fact.

5. The method of claim 4 wherein the weight of significance is based on properties of the suspicious fact.

6. The method of claim 5 wherein the weight of significance is based on a comparison of properties between the suspicious fact and the related fact.

7. The method of claim 1 wherein the forensic facts are extracted from a plurality of artifacts of the system or network.

8. The method of claim 7 wherein a plurality of forensic events from the artifacts are representative of the forensic fact.

9. The method of claim 1 wherein receiving the forensic facts includes:
extracting action-based forensic events from an artifact of the system or network having the set of forensic events;
normalizing properties of the action-based forensic events into a schema;
deduplicating the action-based forensic events; and
aggregating the deduplicated action-based forensic events.

10. The method of claim 9 wherein deduplicating the action-based forensic events includes maintaining properties of the action-based forensic events in the schema.

11. A computer readable storage device to store computer executable instructions to control a hardware processor device to:
receive forensic facts extracted from a set of observable forensic events in a digital artifact data source on the system or network, the forensic facts consisting of action-based forensic events, the forensic facts having dynamic type properties in a schema with a record, the record of the dynamic type properties in the schema including a plurality of properties having weights and including a confidence of correlation property to another forensic fact based on an amount of the properties in the record that have changed with respect to the another forensic fact and the weights of such properties;
identify a suspicious fact from the forensic facts, the identifying the suspicious fact includes initiating an investigation; and
identify a related fact from the forensic facts based on the dynamic type properties of the suspicious fact.

12. The computer readable storage device of claim 11, computer executable instructions to control the processor to:
present the suspicious and related fact on a timeline in a visualization.

13. The computer readable storage device of claim 12 wherein the related fact includes a weight of significance with respect to the suspicious fact.

14. The computer readable storage device of claim 11 wherein the set of forensic facts are extracted from artifacts on the system or network.

15. The computer readable storage device of claim 14 wherein the artifacts includes a master file table, change journal, registry key, and event log.

16. The computer readable storage device of claim 11 wherein suspicious fact and related fact are applied as an indicator of compromise.

17. A system, comprising:
a memory device to store a set of instructions; and
a hardware processor device to execute the set of instructions to:
receive forensic facts extracted from a set of observable forensic events in a digital artifact data source on the system or network, the forensic facts consisting of action-based forensic events, the forensic facts having dynamic type properties in a schema with a record, the record of the dynamic type properties in the schema including a plurality of properties having weights and including a confidence of correlation property to another forensic fact based on an amount of the properties in the record that have changed with respect to the another forensic fact and the weights of such properties;
identify a suspicious fact from the forensic facts, the identifying the suspicious fact includes initiating an investigation; and
identify related facts from the forensic facts based on the dynamic type properties of the suspicious fact.

18. The system of claim 17 wherein the related fact includes a weight of significance with respect to the suspicious fact.

19. The system of claim 17 wherein the receive forensic facts includes:
extract action-based forensic events from an artifact of the system or network having the set of forensic events;
normalize properties of the action-based forensic events into a schema;
deduplicate the action-based forensic events; and
aggregate the deduplicated action-based forensic events.

20. The system of claim 17 implemented as a security service in a cloud environment.

* * * * *